CHARACTER READER

Filed Dec. 30, 1963

INVENTOR
BENNIE L. GALLIEN,
BY John R. Manning
ATTORNEY

United States Patent Office 3,320,588

Patented May 16, 1967

3,320,588
CHARACTER READER

Bennie L. Gallien, Hurst, Tex., assignor to Sperry Rand Corporation, New York, N.Y., a corporation of Delaware Filed Dec. 30, 1963, Ser. No. 334,097
10 Claims. (Cl. 340—146.3)

Figure 1:
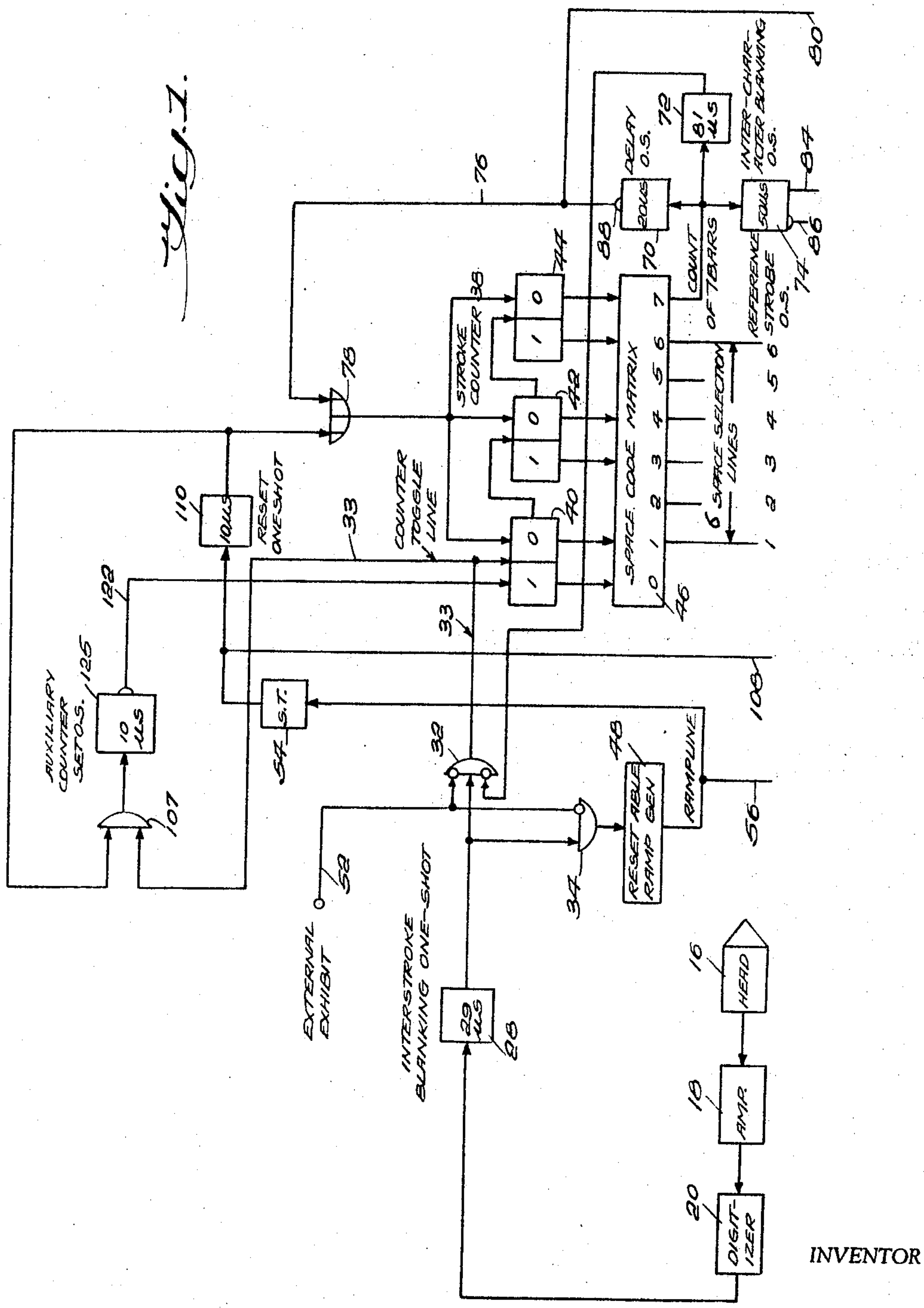

This invention relates to means for automatically recognizing human language symbols and, more particularly, to improved apparatus for automatically recognizing alphabetical characters, numbers and special symbols printed on documents, paper tapes or other materials appropriate for use at the input to high-speed electronic data processing apparatus.

Although the embodiment shown and described relates to the identification of magnetically encoded characters and symbols, it is equally applicable and compatible as an optical character identification system.

Some years ago, a new, efficient means of handling the several billion documents processed annually in this country was made available to American industry. It came about due to the introduction of magnetic ink character recognition (MICR) systems. Various countries and companies have adopted character fonts which take many forms. The present invention relates to a character recognition system for reading and identifying characters formed of a plurality of bars which may have different widths separated by different distances (narrow or wide spaces).

Present day business institutions are increasing in size and complexity. Accordingly, the need for automatic means for handling business documents is urgent. In particular, industries involving sales, banking, transportation and the like are faced with the problem of sorting and accounting on a day-to-day basis for sales slips, checks, deposit slips, tickets, etc. in quantities such that the manual handling of these business documents becomes almost a hopeless undertaking. Although several systems have been devised in working toward a solution to this problem, it appears that the use of human language symbols printed in magnetic ink on the documents themselves in conjunction with equipment capable of recognizing these symbols automatically offers perhaps the most practical means for minimizing the handling of the documents. It is in this light that the present invention has been embodied, thereby eliminating limitations inherent in character reading systems previously developed.

MICR (Magnetic Ink Character Recognition) systems have been known for some time. It appears that the goal to which these systems are striving is the capability of reading and interpreting a character font which is identical in all respects to the conventional typewritten font. Early MICR systems utilized characters or a font having a predetermined number of magnetic dots formed within the character. Also, other known MICR systems utilized a conventional character accompanied by a bar or other such code. Later systems utilized highly-stylized characters which produced unique signals which were easily identifiable by the character reading system. One such font is the well-known E13B font which has been standardized and accepted by the American Banking Association. Today, almost everyone is familiar with these characters in that they appear at the bottom of nearly all checks used in the United States. Although this font (the E13B font) has received a high degree of acceptance in certain areas, many objections and disadvantages to the use of this font have occurred. The font is highly stylized and may be found to be visually objectionable with certain of the characters. In addition, the printing tolerances of the characters must be held to absolute minimums if the system employed in reading the characters is to achieve any great degree of accuracy. Also, the reader employed in reading and interpreting the E13B font is very sensitive to the magnetic intensity of the ink and highly sensitive to variations in the speed of the document past the reading means.

Accordingly, the present invention is provided to overcome the disadvantages of known systems by the embodiment shown which is capable of reading and interpreting a font which employs little stylization and which reader can be manufactured at much less cost than known magnetic ink character recognition systems. In addition, the reader of the present invention will read and interpret a character having widely varying magnetic ink intensities, is greatly insensitive to ink splatter, is practically insensitive to the height of the character font, and will still maintain a high degree of accuracy during power line variations. Also, the sensitivity of the reader to the variations in the speed of the document past the read head has been greatly reduced.

The coded character which the reader of the present invention is designed to read and interpret is readily identifiable to the human eye and is composed of, for example, seven vertical strokes or bars. It will be understood that the number of strokes may be more or less than seven but this number of strokes has been selected in that it presents an acceptable compromise between ease in printing and ease in interpreting with the human eye. These seven vertical strokes or bars define six intervals (spaces) and are formed into the over-all shape of a character. There are two interval widths known as long intervals, and four interval widths known as short intervals, thus allowing fifteen combinations for the ten digits and five special symbols. The alphabetic characters may comprise one or three long interval spaces, allowing twenty-six combinations for the twenty-six alphabetic letters. The intervals between the vertical bars are numbered one through six, from left to right on the printed character. Their value, in terms of logical expressions, may be represented by the digit zero for short intervals and by the digit one for long intervals. Character recognition takes place by means of identification of interval lengths between adjacent strokes or bars. Stroke sensing can take place either magnetically (the character must then be printed with magnetic ink) or optically (in which case the character may be printed with a conventional printing ink). Examples of such character fonts will be discussed later with reference to the figures.

The objects of the present invention are accomplished by passing characters formed of magnetic ink bars past a D.C. magnetization source and a read head at a speed, for example, of 300 inches per second. The low-level analog signal developed by the read head is sent to a linear amplifier and then to a digitizer or peak detector circuit. In this circuit the analog to digital conversion, which is important in accurately determining the wide and narrow intervals in the character, takes place. The output of the peak detector circuit is a series of digital pulses corresponding to the interval spacing of the characters passing the read head. These pulses are fed to a stroke counter and to a resettable ramp generator. The translation from time to voltage takes place in the resettable ramp generator. The peak amplitude to which the output of the ramp generator charges is a function of the spacing of the pulses at its input. These peaks are stored in six ramp storage circuits which are sequentially selected by the stroke counter. The six stored levels are then applied to six comparators and to a peak level detector, the output of which also is applied to the six comparators. The levels corresponding to wide intervals will cause the corresponding comparators to turn on, thereby identifying the character. The output from the six comparators are fed to the reject circuitry and to an output decoding matrix. Here the numeral or symbol is presented on one of fifteen output lines.

An important aspect of the present invention is the utilization of a comparator technique for sensing the difference between wide and narrow stroke intervals, rather than the use of a threshold detector arrangement. The use of the comparator technique will permit the circuitry to select the wide and short intervals, regardless of their amplitude. If a threshold detector were employed to sense the absolute level to which the ramp generator rose during a pulse interval, the large speed variations of the check transport mechanism would produce erroneous information since accurate determination of the wide or narrow intervals could not be established. In other words, a narrow interval at slow speed would cause a corresponding ramp amplitude of as much as a wide interval at a higher speed. Similarly, a heavily encoded character having ink splatter carried over into the interval space, could be misinterpreted while a properly formed character would have different characteristics. This would make a fixed level threshold detector undesirable if a wide range of characters are to be read and accurately interpreted.

Figure 2:
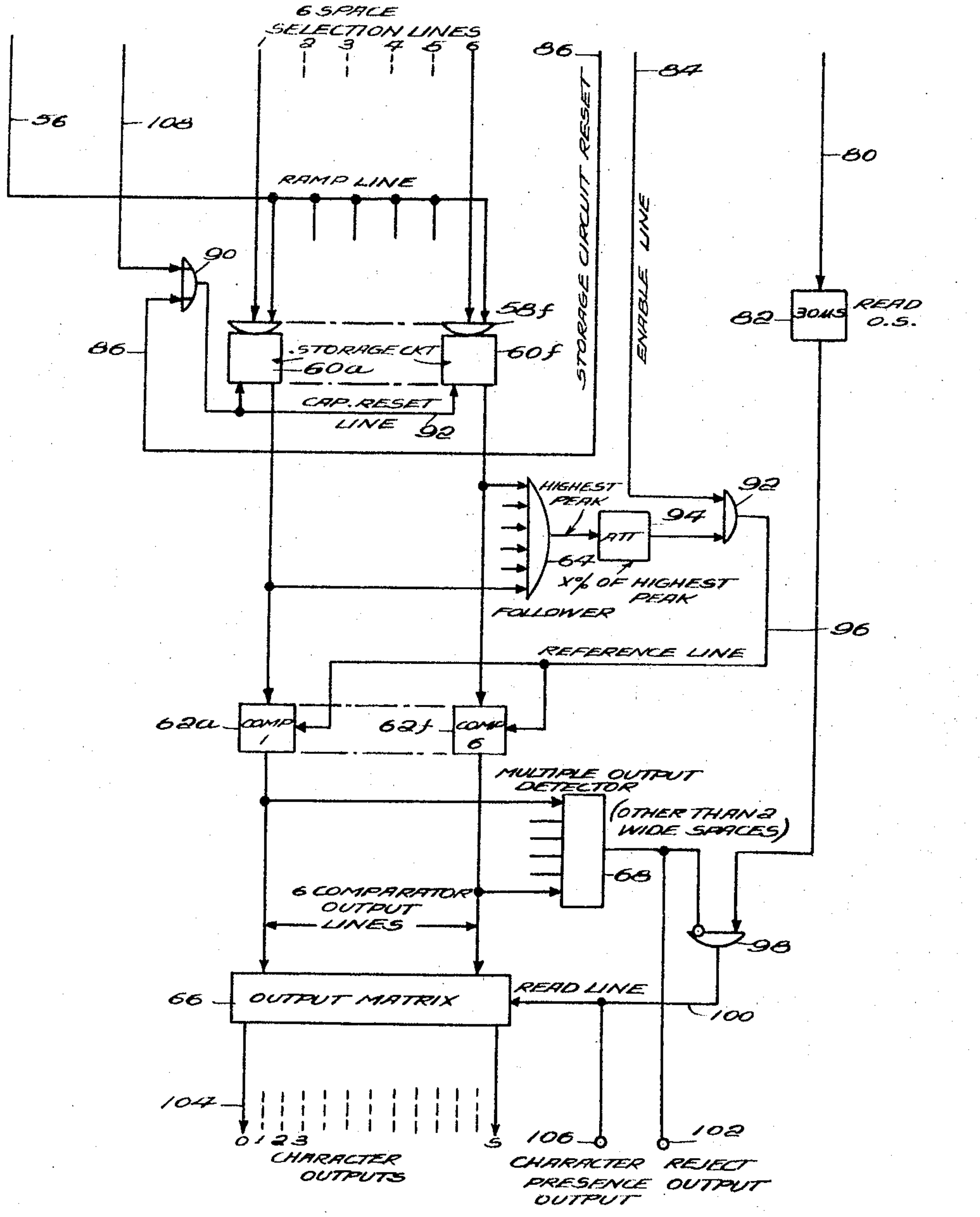
Figure 3A:
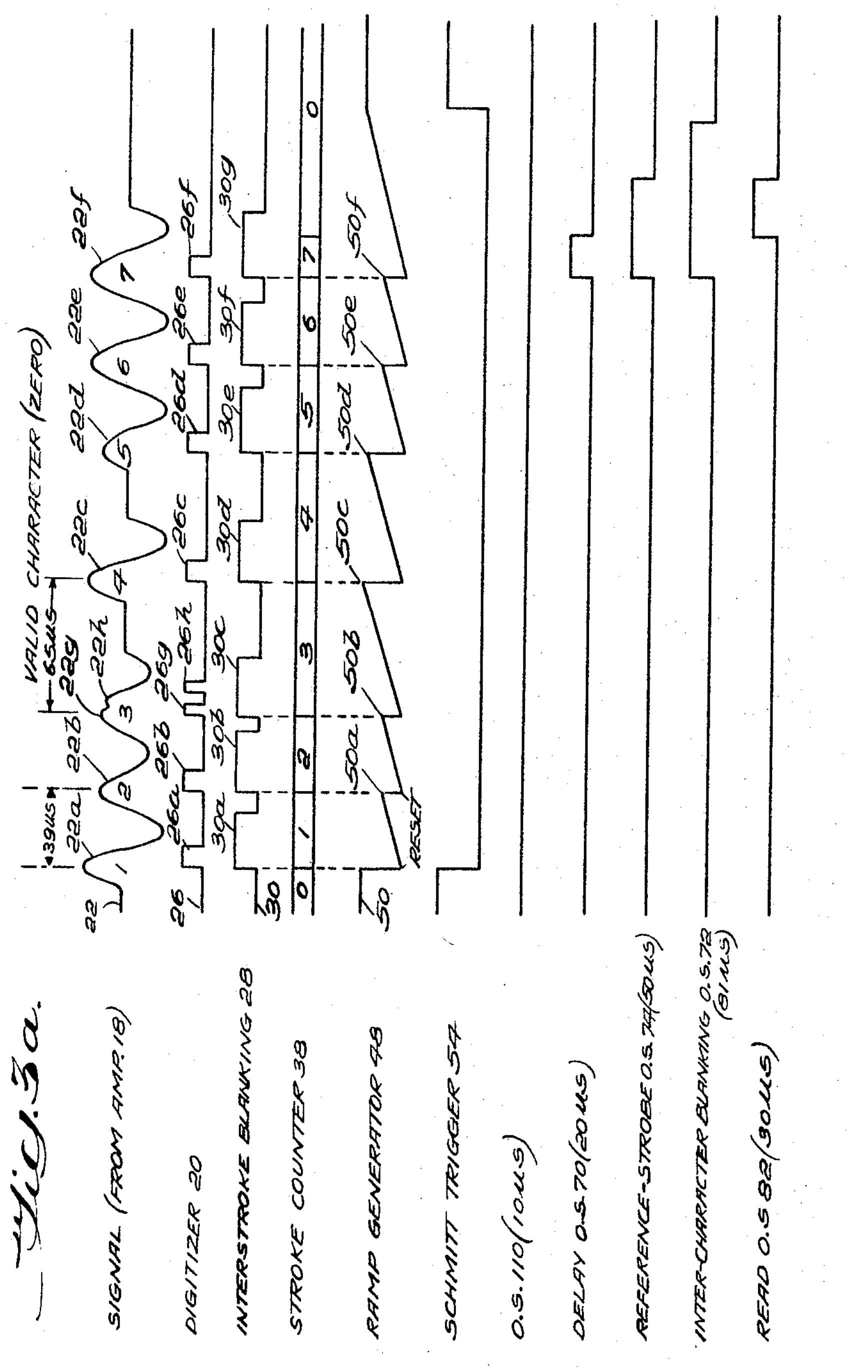
Figure 3B:
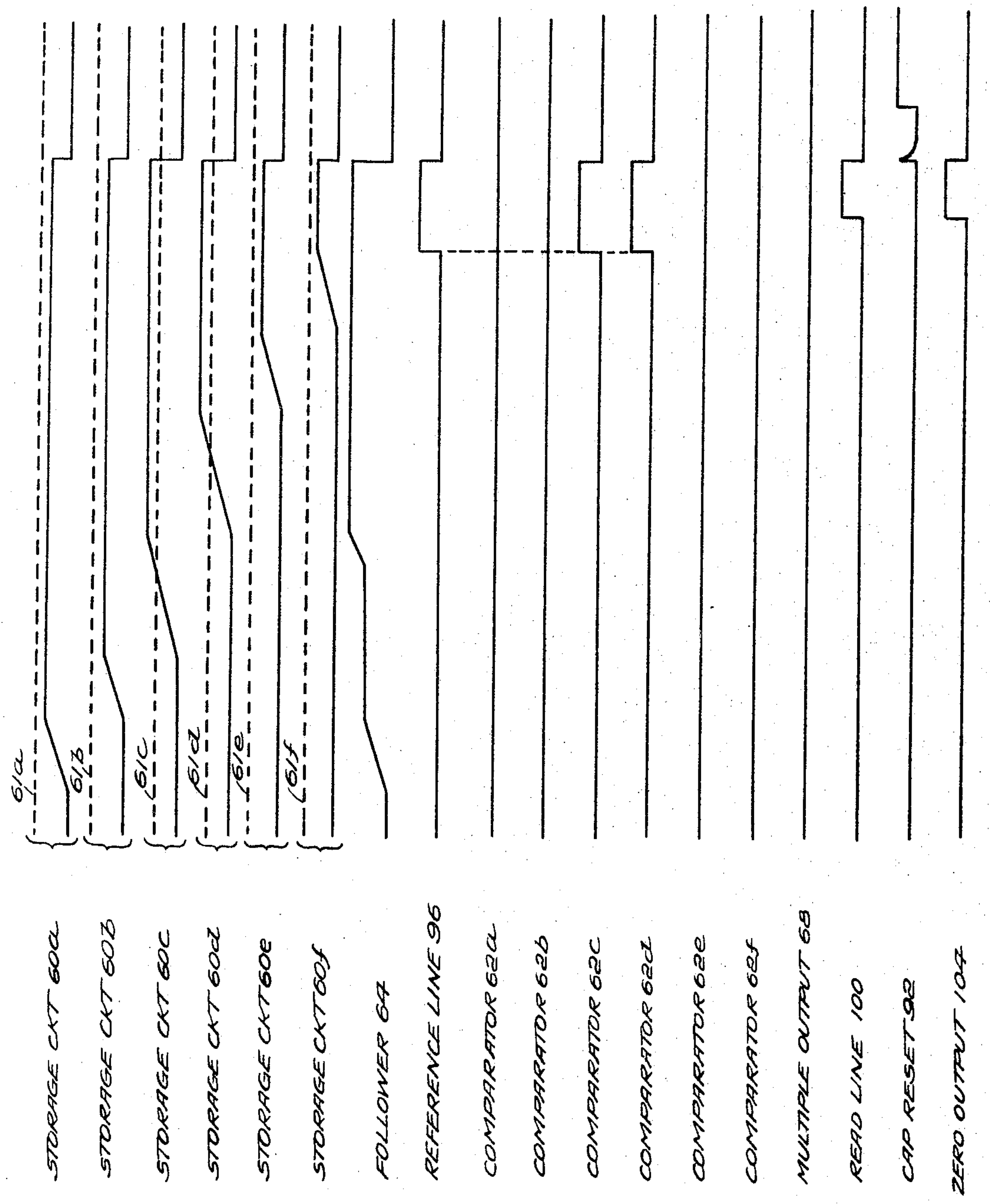
Figure 4A:
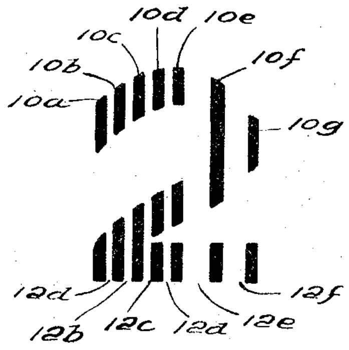
Figure 4B:
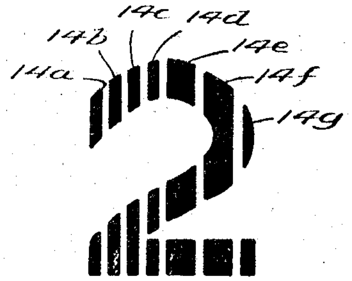
Figure 5A:
Figure 5B:
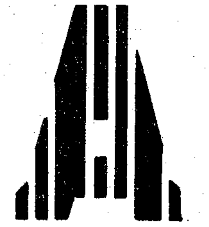
Figure 6A:
Figure 6B:
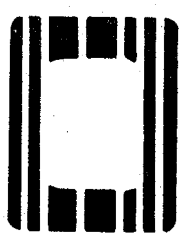

In the drawings:

FIGURE 1 is an electrical block diagram of a portion of the invention;

FIGURE 2, when placed under the FIGURE 1, is a block diagram of another portion of the invention and completes the system when so placed;

FIGURES 3*a* and 3*b* are electrical wave forms appearing at various points of the FIGURES 1 and 2;

FIGURES 4*a*, 5*a* and 6*a* are examples of the types of characters which the present invention is capable of reading and interpreting; and, FIGURES 4*b*, 5*b* and 6*b* are examples of character types that may be read and interpreted by simple modifications of the present invention.

Before proceeding with a discussion of the preferred embodiment of the invention, it may be helpful to discuss the character font which is capable of being read and interpreted by the present invention. With reference to FIGURE 4*a*, the coded character is composed of seven vertical strokes or bars 10*a* through 10*g*. These seven vertical strokes or bars define six intervals or spaces 12*a* through 12*f*. There are four short intervals or widths 12*a*, 12*b*, 12*c* and 12*d* and two long interval widths 12*e* and 12*f*. As the example discloses, the numerical code may comprise a combination of four short intervals and two long intervals, thus permitting fifteen combinations for the ten digits and five special symbols. The alphabetic code may comprise one or three long intervals and five or three short intervals, respectively, thus making available twenty-six combinations for the twenty-six alphabetical characters. It will be readily understood that the circuit of the present invention will be capable of, by simple modification, interpreting any combination of wide and short intervals of which a character may be comprised. The intervals or spaces 12*a* through 12*f* are numbered from left to right on the printed character. In a binary logical expression, their value may be represented by the digit zero for the short intervals and by the digit one for long intervals. The automatic character recognition takes place by means of identification of interval length between interval strokes or bars. Stroke sensing can take place either magnetically (the character must then be printed with magnetic ink), or optically (in which case the character may be printed with a conventional printing ink). A stroke or bar may consist of several vertical elements or segments according to the character. For example, in the FIGURE 4*a*, the digit "2" is formed of the bars 10*a*, 10*b*, 10*c*, 10*f* and 10*g* having two segments while the bars 10*d* and 10*e* have three segments.

The FIGURES 5*a* and 6*a* show characters having other codes but still composed of the seven bars, two wide spaces or intervals and four short intervals. The FIGURES 4*b*, 5*b* and 6*b* show a second type or font of characters which may be read by the circuit of the present invention after simple modification. It will be noted that the characters in these figures are formed to six equal spaces or intervals and five narrow bars (the bars 14*a*, 14*b*, 14*c*, 14*d* and 14*g*) and two wide bars (the bars 14*e* and 14*f*). Similarly, the FIGURE 5*b* and 6*b* show characters formed of this code. The modifications necessary for the present invention to interpret the characters of the FIGURES 4*b*, 5*b* and 6*b* would comprise the recognition of the position of the two wide bars rather than the two wide spaces as shown in the FIGURES 4*a*, 5*a* and 6*a*. For a more detailed explanation of these characters, reference may be had to the United States patent to Feissel 3,044,696.

With reference to FIGURES 1 and 2, documents or other supporting means bearing characters of the type shown on the FIGURES 4*a*, 5*a* and 6*a* are D.C. magnetized (by conventional means, not shown) and transported (by means not shown) past a reading head 16. The output of the head 16 is coupled to a linear amplifier 18 whose output is directed to a digitizer 20. The output from the amplifier 18 may be a signal such as that shown in the FIGURE 3*a* and identified as the wave form 22. It will be noted that the wave form 22 comprises seven positive and seven negative excursions from the reference line indicative of the seven bars of the characters. The time separation of the seven excursions is indicative of the separation of the seven bars comprising the character.

The output from the amplifier 18 is coupled to the digitizer 20 which is, in essence, an analog to digital converter. In the embodiment of the invention which was actually constructed and successfully operated, the digitizer 20 comprised a serially connected phase-shifting circuit, a Schmitt trigger, an emitter-follower stage and an amplifier whose output is coupled to the input of a one-shot multivibrator 28. A typical output from the digitizer 20 is shown in the FIGURE 3*a* as the wave form 26.

In the digitizer 20, the phase of the analog signal is shifted by 90 degrees and applied to the Schmitt trigger in the digitizer 20, which acts as a zero-crossing detector. This, in effect, is a peak-sensing circuit since detecting the zero-crossing of the wave form shifted by 90 degrees is equivalent to detecting the exact peak, or zero slope of the original wave form. The location of these peaks corresponds very closely to the actual stroke or bar intervals, regardless of the amplitude of the wave form. The zero-crossing detector generates a pulse each time the input goes through zero volts. This creates a series of digital pulses of varying repetition rate, corresponding to the peak-to-peak spacing of the analog signal received from the character as it passes the read head 16. This series of pulses will contain two wide intervals and four narrow intervals, corresponding to the wide and narrow intervals in the character itself. (See, for example, the wave forms 22 and 30 of the FIGURE 3*a*.)

The output of the digitizer 20 is coupled to an OSMV (one-shot multivibrator) 28 which has a period of approximately 29 microseconds. A typical wave form from the OSMV 28 is shown in the FIGURE 3*a* and identified as the wave form 30. From the wave forms shown in the FIGURE 3*a*, it will be noted that, whereas the wave form 26, from the digitizer 20, comprises a plurality of approximately equal pulses 26*a* through 26*f* and smaller pulses (in time) 26*g* and 26*h*, the wave form 22 is composed of somewhat symmetrical signals 1 through 7. Upon closer inspection, it will be observed that the wave 3 of the wave form 22 has a double peak indicated at 22*g* and 22*h*. The double peaks 22*g* and 22*h* are generated from noise, an imperfectly formed bar, or in other ways, thus, producing the double square waves 26*g* and 26*h*. Although the wave form 22*g* and 22*h* has caused a signal 26 to be produced which may erroneously indicate that the character is composed of eight bars, the OSMV 28, having a time period somewhat less than the peak-to-peak period in the wave form 22, in effect provides blanking and has produced a single square wave 30c, thus ignoring the spurious or unwanted peak 22h and subsequently produced signal 26h. Accordingly, the output of the OSMV 28 correctly indicates a signal train 30 having a number of pulses 30a through 30g corresponding to the proper number of bars in a character, thus eliminating the spurious signal 26h.

The output from the OSMV 28 is directed to an inhibit AND gate 32, and an inhibit AND 34. The output from the AND gate 32 is directed to and AND gate 107 and to a stroke counter 38, having the stages 40, 42 and 44. The flip-flops 40, 42 and 44 will indicate on their outputs to a space code matrix 46, a binary code representation of the number of bars that have passed the reading head 16. Initially, the lines 1 through 6 of the space code matrix 46 will be off indicating that no character has passed the read head 16. As the output of the OSMV 28 produces outputs indicative of the bars passing the reading head 16, the space code matrix 46 will indicate on its space selection lines 1 through 7, the number of bars that have passed.

The output from the OSMV 28, as shown in the FIGURES 1 and 3*a*, is also applied to an inhibit AND gate 34 whose output is directed to a resettable ramp generator 48. The ramp generator 48 may be of a type well known in the art which, after being reset, charges at a constant rate until it reaches its maximum level or is reset. It will be seen by reference to the FIGURE 3*a*, that the ramp generator 48 generates a wave form 50 which is reset by the leading edge of the wave form 30. Thus, the ramp generator 48 charges to a value dependent upon the spacing between the bars of the character. It will be noted that narrow spaces produce the peaks indicated at 50a, 50b, 50e and 50f while wide spaces produce the peaks as shown at 50c and 50d.

An external inhibit of the stroke counter 38 and the resettable ramp generator 48 is provided by including an external inhibit conductor 52 which is applied to the inhibit terminals of the gates 32 and 34. The application of a signal along this line disables the reader.

The output of the resettable ramp generator 48 is a positive-going, linear ramp, which resets each time it receives a pulse from the OSMV 28. If no reset pulse occurs, the ramp merely tops out and fires a Schmitt trigger 54 which resets the stroke counter 38 and the ramp storage circuits 60a through 60f (of the FIGURE 2), and initiates an auxiliary counter set circuit including the AND gate 107 and the OSMV 125.

The output of the ramp generator 48 (FIGURE 1) is applied to a Schmitt trigger 54 and, via a conductor 56, to a plurality of AND gates 58a through 58f (FIGURE 2), equal in number to the number of spaces in a character. In the particular embodiment which is described and shown in this application, the number of inhibit AND gates 58a through 58f would be six. Connected to the other of the terminals of the AND gates 58a through 58f, respectively, are the space selection lines 1 through 6 from the space code matrix 46. The output from the AND gates 58a through 58f are coupled, respectively, to a plurality of storage circuits 60a through 60f, which circuits may include a capacitor.

As noted, the series of seven strokes or bars forming the character to be read and interpreted causes the digitizer 20 and the OSMV 28 to generate a series of seven corresponding pulses. A first pulse will cause the space selection line 1 of the space code matrix 46 to activate the first ramp storage circuit 60a and will also drive the output of ramp generator 48 down (see the FIGURE 3*a*). Having been reset, the ramp generator will now start charging toward its most positive level. As the next bar of the character is read, the output of the ramp generator 48 will be interrupted at some point during its charge by the second pulse from the OSMV 28, which will also cause the space code matrix 46 to step to space selection line 2, thus turning off line 1. At this instant, ramp storage circuit 60a is deactivated, leaving the peak ramp voltage developed during the preceding period stored in the capacitor of the storage circuit 60a. As shown in the FIGURE 3*a*, this voltage, for example, would be that shown at 50a of the wave form 50. As each succeeding pulse occurs, the corresponding ramp storage circuit 60 is activated. This operation continues until the peak amplitudes of each of the six ramps (corresponding to the six spaces between the seven vertical bars) have been stored in their respective storage circuits 60a through 60f.

The output of each of the storage circuits 60a through 60f is coupled, respectively, to comparator circuits 62a through 62f. In addition, each of the output lines from the storage circuits 60a through 60f are coupled to a follower circuit 64, which will be discussed in detail directly.

The comparator circuits 62a through 62f are of a type known in the art which will produce an output signal only when its input exceeds a reference level. In the present invention, the reference level is dynamic in that it may be different for each character read. The generation of the reference level will be discussed shortly.

The six comparator output lines from the comparator circuits 62a through 62f (only two of which are shown, for the purposes of simplicity) are directed to an output matrix 66 and a multiple output detector 68. The output matrix 66 will translate the input code of signals on two of its lines to a pulse on one of its fifteen character output lines (zero through nine and several sign indicating conductors) which is indicative of the particular character read. The function of the multiple output detector 68 is to detect when an invalid code is being indicated. Since the present invention is directed to reading characters having two wide spaces, the multiple output detector 68 is sensitive to this condition and will produce an output if other than two wide spaces are indicated. In the event that alpha-numeric characters are to be read by the system, then the multiple output detector 68 would be modified accordingly to detect any invalid codes. At the same time, a larger output matrix would be necessary to accommodate the additional 26 alphabetical output lines.

With reference to the FIGURE 1, when the space code matrix 46 is indicating that seven bars have been counted, a signal is coupled from the "seven" output line to a delay OSMV 70, an inter-character blanking OSMV 72 and a reference strobe OSMV 74. The output of the delay one-shot 70 acts also as a trailing edge differentiator and is applied by the conductor 76 to a reset OR circuit 78. At the count of seven bars, a delayed signal on the conductor 76 will reset the stroke counter 38 making it ready for the next character. In addition, the output from the one-shot 70 is applied by a conductor 80 to a read OSMV 82 (FIGURE 2). The output of the blanking one-shot 72 is coupled to the inhibit AND gate 32 to provide an inhibit or blanking signal between characters so that any extraneous noise or ink will not cause the stroke counter 38 to advance.

As indicated earlier, a raised portion, such as that indicated at 88 from the one-shot 70, indicates that a trailing edge differentiator is employed along with the output of the OSMV. Similarly, the same situation prevails as shown on the output line 86, from the reference strobe OSMV 74, which is directed to an OR circuit 90 of the FIGURE 2. This conductor is labeled "Storage Circuit Reset." The output of the OR circuit 90 is directed to the storage circuits 60a through 60f on the capacitor reset line 92. Also, the output from the one-shot 74 is directed by a conductor 84 to the AND gate 92 which acts as an enable signal for the reference line.

As shown in the FIGURE 2, the output from the follower 64 is applied to an attenuator 94 whose output is connected to the AND gate 92. The output from the AND gate 92 is on the reference line 96 which forms the reference for the comparator circuits 62a through 62f. The follower 64 is in effect a six-input diode gate whose output will follow the highest amplitude voltage appearing at any of its inputs from the storage circuits 60*a* through 60*f*. During the time that the six ramp levels are being sequentially stored on the storage circuits 60*a* through 60*f*, the follower 64 is sensing the highest peak stored in any of the six storage circuits 60*a* through 60*f*.

If a valid character has passed the read head 16, there will now be stored in *two* of the storage circuits 60*a* through 60*f*, a significantly higher voltage level than that stored in the remaining *four* storage circuits. These two highest voltage levels correspond to the two wide intervals or spaces in the character under observation. This highest output voltage from the follower 64 is then directed to the attenuator 94, which reduces its amplitude by a percentage of its original value. In the embodiment of the invention which was constructed and successfully operated, the attenuator 94 reduced the amplitude to 80% of its original value. The 80% value appeared to be midway between the stored voltage level caused by a wide space and the stored voltage level caused by a narrow space between the bars of the characters.

When the space code matrix 46 of the FIGURE 1 is indicating that the seventh bar has been counted, the enable signal on the conductor 84 from the OSMV 74 will provide the other input to the AND circuit 92 of the FIGURE 2. At this time, the voltage at the output of the attenuator 94 is applied to the reference line 96 which is coupled to the comparator circuits 62*a* through 62*f*. The comparator circuits 62*a* through 62*f* have other inputs from their respective ramp storage circuits 60*a* through 60*f*. The voltage on the reference line 96, since it falls about midway between the highest and the lowest stored levels in the storage circuits 60*a* through 60*f*, will cause two of the comparators 62*a* through 62*f* to turn on while the other four comparators remain off. The comparators which turn on represent the location of the two intervals in the character just read.

The outputs from the comparator circuits 62 *a* through 62*f* are directed to a reject circuit such as a multiple output detector 68. If only two comparators are on, thus indicating that a valid character has been read, the reject circuit 68 will pass the comparator outputs to the output matrix 66 by not inhibiting the AND gate 98. It will be noted that the read OSMV 82 provides the other input to the AND gate 98. Thus, assuming that no reject has been detected, a signal on the read line 100 will permit the output matrix 66 to decode the comparator contents indicated on its input conductors into the corresponding digits or symbol on its outputs. In the event that something other than two comparator outputs were on, indicating an erroneous character reading, the circuit 68 would have inhibited the output of the AND circuit 98 and, thus, prevented a read signal on the read line 100 to the output matrix 66. A reject of this type would then be indicated at the reject output terminal 102. The output terminal 106 may be utilized to indicate that a valid character has been read.

With reference to the FIGURE 1, an output is also taken, as noted earlier, from the ramp generator 48 to a Schmitt trigger 54 whose output will provide reset signals and a type of dynamic memory under certain conditions. The output of the circuit 54 is directed to a reset OSMV 110 and, via the conductor 108, to the OR circuit 90 of the FIGURE 2. The stroke counter 38 may be reset under certain conditions through this OSMV 110 whose output is connected to the OR 78.

To reiterate then, the Schmitt trigger 54, which conducts only if the ramp voltage nearly "tops out" or, just before it reaches its highest value, has the following functions: It will reset the storage circuits 60*a* through 60*f* via the conductor 108 and OR circuit 90; it will reset the stroke counter 38 after 10 microseconds via the reset one-shot 110 and OR circuit 78; and, will condition the AND gate 107 which provides a type of memory in the event that the one-shot 28 is pulsing the stroke counter 38 but the counter 38 can not be advanced at that time since the counter is being reset.

The "certain conditions" just set forth, may be as follows. If a particle of ink splatter or other extraneous noise should pass the read head 16, a signal may be generated which looks almost exactly like the stroke of a valid character. The signal caused by this extraneous ink would fire the stroke counter 38 and the ramp generator 48, thereby causing a following valid character to be misread. To prevent this, the Schmitt trigger 54 is connected to receive an output of the ramp generator 48 and is set to conduct just prior to the time that the ramp voltage reaches its maximum value. If a second stroke does not occur before the ramp does reach its maximum value, the Schmitt trigger 54 will conduct, thus resetting the storage circuits 60*a* through 60*f* and also providing a pulse to the one-shot 110, which after, for example, ten microseconds, will reset the counter 38.

Another condition which utilizes the Schmitt trigger 54 occurs when the OSMV 28 is pulsing the AND gate 32 to advance the stroke counter 38 but the counter 38 can not be advanced at this time since the counter 38 is being reset. This condition may occur due to the generations of noise, just discussed. Immediately following the noise, assume that a valid character is now being read and a signal indicative of the passage of the first bar is trying to enter the stroke or bar counter 38; however the signal can not advance the counter 38 since the noise signals just generated, required that the counter 38 be reset at this time. To preserve the signal that a bar or stroke must be counted, a first stroke storage circuitry is Provided Comprising an AND gate 107 and an Auxiliary Counter Set OSMV 125. After the counter 38 is reset, then the one-shot 125 will insert a count to advance the counter 38.

It will be noted that an output is also taken from the OSMV 110 to the AND gate 107. In addition, the AND gate 107 receives an input from the AND 32 via the conductor 33. The output of the AND 107 is coupled to the Auxiliary Counter Set one-shot 125 whose output on the conductor 122 is connected to the "one" side of the flip-flop 40 of the counter 38.

Just before the ramp generator 48 "tops out," the Schmitt trigger 54 will generate an output to trigger the one-shot 110. The one-shot 110 remains on for 10 microseconds during which time it is performing two functions. First, it clamps the reset lines to the stroke counter 38 to ground so that the counter 38 is in its reset condition or state. Second, it enables one input to the AND gate 107. The other input to the gate 107 is on the conductor 33, the counter toggle line. In this way, if the first stroke or bar of the next character is generated during the time that the reset one-shot 110 is on, that stroke will not be able to set the stroke counter 38 to its "one" state because the counter reset is clamped to ground. Hence, the first stroke of the character under these conditions, must be stored until the counter 38 is able to receive it. To accomplish this, the Auxiliary Counter Set one-shot 125 is triggered by the AND 107 and at the end of 10 microseconds, a pulse is applied to the conductor 122 which sets the stroke counter 38 to its "one"state. Thus, the first stroke, which may have passed undetected, was stored and inserted into the stroke counter 38 ten microseconds later.

The circuitry just described may only be required when the stroke counter 38 has actually counted a valid bar but was being reset by the one-shot 110. This means that the counter may miss the first count caused by the first valid stroke of the succeeding character. To correct for this situation which may occur, the AND gate 107 and OSMV 125 were provided to pick up the count and insert it into the counter 38 at a later time.

To afford a better understanding of the invention, reference will be had to the drawings and the operation of the circuit will be set forth in terms of the actual reading of a character. We will select, for this example, the digit or figure 0 of the FIGURE 6*a*. Accordingly, a document bearing the alpha-numeric character 0 is advanced past the reading head 16 of the FIGURE 1 by any suitable means. After amplification of the wave form by the amplifier 18, the signal appears such as the wave form 22 of the FIGURE 3*a*. It will be noted from the FIGURE 6*a*, that the character to be identified is coded in such a manner that, from left to right, the character is composed of bars forming two narrow spaces, two wide spaces, followed by two narrow spaces. It will be noted from the FIGURE 3*a* and the wave form 22 that this characteristic is identifiable. Although the positive and negative excursions of the wave form 22 indicate the bars of the character, the time separation from peak to peak of the wave form 22 represents the space separation of the bars. Following the coding of the character, it will be noted that short spaces are represented between the peaks 1 and 2 and 2 and 3. Similarly, wide intervals or spaces are represented between the peaks 3 and 4 and 4 and 5. Lastly, narrow spaces or intervals are again indicated between the peaks 5 and 6, and 6 and 7.

With reference again to the FIGURE 1, the characteristic wave form of the character 0 from the amplifier 18 is applied to the digitizer 20 which, as previously set forth, produces a wave form such as the wave form 26 of the FIGURE 3*a*. It will be noted that the wave form 22 at the position 3 is composed of two peaks **22*g* and 22*h*. Accordingly, the digitizer 20 produces the two square waves 26*g* and 26*h*. Since the double peaked wave is erroneous and may have resulted from ink splatter or an imperfectly formed bar of a character, the output of the digitizer 20 is coupled to a one-shot 28 whose period is greater than the time between the leading edges of the waves 26*g* and 26*h*. Accordingly, the erroneous information is dropped and the one-shot 28 produces a correct wave form 30**

From the wave form 30, it will be noted that the character is now represented as a wave form having seven bars represented by the square waves **30*a* through 30*g***, which square waves are separated by distances related to the separation of the bars of the character of the FIGURE 6*a*. From the wave form 30, it will be observed that wide spaces occur between the third and fourth bars and the fourth and fifth bars while narrow spaces occur between the remaining bars. This code agrees with the character of the FIGURE 6*a*.

The output of the one-shot 28 is coupled to step the stroke counter 38, through the AND circuit 32, to its output line. In addition, the ramp generator 48 is reset through the AND circuit 34.

With reference to the FIGURE 3*a*, at the start of the conduction of the 1 line of the stroke counter 38, the ramp generator 48 reset and commences to rise to a level indicated by **50*a* corresponding to the space between the first and second bars of the character. It will be observed that this spacing is a narrow space and a voltage representative of this narrow space is applied by the conductor 56 to the first storage circuit 60*a* of the FIGURE 2. Since space selection line 1 from the space code matrix 46 to the AND circuit 58*a* is conductive, the voltage 50*a*** of the FIGURE 3*a* is stored in the storage circuit **60*a* of the FIGURE 2 and is not stored in any of the other storage circuits 60*b* through 60*f* since only one space selection line at a time from the space code matrix 46** is conductive.

The voltage level stored on the storage circuit **60*a***, FIGURE 3*b*, is as shown. The dotted line **61*a* drawn above the wave form stored on the storage circuit 60*a*, is not intended to indicate any reference line or the like but is merely inserted at an equal distance from the quiescent value, from which the storage circuits 60 rise. The dotted lines 61*a* through 61*f*, being at equal distance from the quiescent level of the storage circuits 60, indicate only that the voltage levels on the storage capacitors have stored a charge representative of some value. This does not mean that the value stored on the storage circuits 60 must exceed or go beyond the dotted lines 61, such as the value stored on the capacitors 60*c* and 60*d*. All values stored on the storage circuit 60 could be below the dotted lines 61** and still obtain positive and accurate information and recognition of the character.

As the character bars continue to advance past the read head 16, the circuits coupled thereto produce or permit ramp voltage levels such as those indicated at **50*b* through 50*f* of the wave form 50** of the FIGURE 3*a*. These values, indicative of the character bar spacing, are successively stored on the storage circuits **60*b* through 60*f* of the FIGURE 2. It will be noted that the level to which the ramp generator 48 rose during the passage of the two wide bars is indicated by the voltage levels 50*c* and 50*d*** of the FIGURE 3*a*. Each time a bar of the character appears, the ramp generator 48 is reset.

As soon as the character has passed the read head 16 and before identification is achieved, the storage circuits **60*a* through 60*f*** will hold charges as shown by the wave forms of the FIGURE 3*b*. It will be noted that the storage circuits **60*a*, 60*b*, 60*e* and 60*f* have been charged to a lower value than the storage circuits 60*c* and 60*d*. Also, the follower 64** (FIGURES 2 and 3*b*) has been following the highest peak of the value stored on the storage circuit 60 and which output is attenuated by a predetermined percentage by the attenuator 94. This value is now presented to the AND circuit 92. At the count of seven bars, the space code matrix 46 now actuates its conductor indicating the passage of seven bars (one character) which actuates the one-shots 70, 72 and 74. The one-shot 72 provides a blanking signal back to the inhibit AND circuit 32 which inhibits any signals generated by ink splatter or the like appearing between the characters which may cause erroneous advancement of the stroke counter 38. In addition, the one-shot 74 provides an enable signal on its conductor 84 which strobes the AND circuit 92 of the FIGURE 2. The signals of the one-shots 70, 72 and 74 are as shown on the FIGURE 3*a*.

Since the voltage on the reference line 96 from the AND circuit 92 of the FIGURE 2 has now been established and applied to the comparator circuits **60*a* through 60*f*, identification of the character will be accomplished. Rather than using a fixed level reference line, automatic means, such as the follower 64 and the attenuator 94**, are employed to change or alter the threshold level (variable reference line voltage) to correspond to anything that tends to electrically or mechanically vary the spacing of the character bars. This invention provides automatic correction means to compensate for changes in document speed, differences in magnetic iron intensity, character bars having different spacing tolerances, and the like, which factors induce relatively higher or lower amplitudes of the ramp voltage. As an example, lightly printed character bars separated by a narrow space, may provide a ramp voltage approximately equal in amplitude to the ramp voltage derived from heavily printed character bars, separated by a wide space or interval. The present system, by utilizing a dynamic reference level, as described, overcomes these problems which causes erroneous reading and identification, by sampling all the coded voltage levels and by selecting the voltage levels indicative of the characters, regardless of their amplitude and not by selecting the voltage levels that have exceeded a predetermined, static level.

The voltage on the reference line 96 on the FIGURE 2 and 3*b* is applied to set the level which must be exceeded for the comparator circuits **62*a* through 62*f* to conduct. The voltage to the comparator circuits 62*c* and 62*d* from their corresponding storage circuits, will exceed the voltage on the reference line 96 (which indicates that these circuit elements are storing and comparing values representative of wide spaces) while the values on the comparator circuits 62*a*, 62*b*, 62*e* and 62*f*** from their associated storage circuits do not exceed the reference line voltage 96 and, thus, do not produce outputs to the output matrix 66. Thus, comparator circuits 62c and 62d are "high" to the output matrix 66 and if the multiple output detector 68 has not indicated an error, then the delay one-shot 70 of the FIGURE 1 which has provided a signal to the read one-shot 82 of the FIGURE 2, will produce a read line signal 100 from the AND circuit 98. Character presence is indicated at the terminal 106 while the 0 character output line 104 from the output matrix 66 indicates that a 0 has been read and identified.

Capacitor reset or discharge is accomplished on a conductor 86 from the one-shot 74 while reset of the stroke counter 38 is accomplished from the conductor 76 to the OR circuit 78. There is the protective loop comprised of the Schmitt trigger 54, the AND 107 and the one-shot 125. If a spot of magnetic ink or similar noise should happen to be generated through the digitizer 20 it would fire the stroke counter 38 and reset the ramp generator 48. The ramp generator 48 will "top out" and fire the Schmitt trigger 54 whose operation has been discussed previously.

The capacitor reset voltage 92 and the 0 character output voltage 104 from the output matrix 66 are shown on the FIGURE 3*b*. Since the character of FIGURE 6*a* which was read appeared to be a well formed character, the first stroke circuitry of the FIGURE 1, has probably not operated but would operate in the manner hereinbefore described if required.

While there has been shown and described certain preferred embodiments of the invention and the best mode in which it is contemplated in employing that invention, it will be understood that modifications and changes may be made without departing from the spirit and scope thereof, as will be clear to those skilled in the art. For example, the operating periods of the one-shot multivibrators are illustrative of those utilized when advancing documents past the read head at a nominal speed of 300 inches per second. Other document speeds may require various other operating times of the one-shots. Also, it will be understood by those skilled in the art that the system is easily modified to read characters of a type composed of variable width bars and constant spacing between the bars.

The embodiments of the invention in which an exclusive property or privilege is claimed are defined as follows:

1. A system for identifying characters comprising a reading means for generating an electrical waveform characteristic of a character advanced past said reading means, said waveform being formed of a predetermined number of distinguishable peaks occurring at various times, means for counting the number of said peaks and providing a read command after receipt of the predetermined number of peaks, storage means under control of said means for counting, for sequentially recording in each of said storage means a value indicative of the time separation of said peaks, and means responsive to said read command for examining the recorded values to achieve recognition of the character advanced past said reading means, said means responsive to said read command for examining the recorded values, including a plurality of comparator circuits equal in number to said storage means, and reference signal generating means connected to said comparator circuits to control said comparator circuits in response to a reference signal which has a value that is commensurate with a significant time reparation of said peaks.

2. The system as defined in claim 1 including means coupled between said storage means and said comparator circuits for generating a reference voltage having a value between the highest and lowest recorded value on said storage means, and means for coupling said reference voltage to said comparator circuits.

3. The system recited in claim 1 including digitizer means responsive to said peaks for producing square wave signals, means controlled by said digitizer for generating a sequence of signals having amplitudes corresponding to the time separation of said peaks from said reading means, said storage means comprising a plurality of separate devices for individually storing one of said generated signals.

4. A system for identifying characters formed of a plurality of vertical bars separated by spaces of varying distances comprising reading means for generating an electrical waveform induced by the passage of a character and having a plurality of peaks equal in number and corresponding in time to the position of the bars of the character, a digitizer responsive to the peaks and producing square waves therefrom, means under control of said digitizer for generating a sequence of signals having amplitudes corresponding to the time separation of the peaks from said reading means, counting means coupled to said digitizer for generating an output signal on a plurality of conductors for each peak of the waveform and corresponding to the vertical bars of the character, said counting means further generating a read command on one of said plurality of conductors after passage of the last vertical bar of a character past said reading means, a plurality of storage means equal in number to one less than the number of bars forming a character, means under the control of the output signals of said counting means for storing the sequence of signals in said storage means one signal per storage means, means for deriving from the signals in said storage means a reference signal having a value intermediate the values of the stored signals, a plurality of comparator circuits coupled to and equal in number to said storage means, means for applying said reference signal to said comparator circuits to cause certain of said comparator circuits to produce output signals, and means for accomplishing character identification by reception of the read command to determine which of said comparator circuits have generated output signals.

5. The combination as defined in claim 4 including additional means coupled to said comparator circuits for indicating an error signal in the event an invalid group of signals are produced by said comparator circuits.

6. The combination as defined in claim 4 including a trigger circuit coupled to said digitizer for resetting said counting means and said storage circuits in the event that one of said signals of said sequence of signals exceeds a predetermined magnitude.

7. The combination as defined in claim 6 including means coupled to said trigger circuit and said digitizer for inserting a count into said counting means after a predetermined time in the event the counting means is being reset during the passage of a character relative to said reading means.

8. Means for identifying the time separation of a group of signals of a waveform wherein the individual signals of the waveform are separated by either a first or a second time period comprising, means for generating other signals whose amplitudes correspond to the time separation of the individual signals, individual means for storing the generated signals, means coupled to said means for storing for generating a reference signal having an amplitude intermediate the amplitudes of said generated signals, and comparator means coupled to receive the stored generated signals and the reference signal to indicate on certain of said comparator means output signals corresponding to those signals separated by one of the time periods.

9. The combination as defined in claim 8 including signal counting means coupled to receive the waveform and for generating a read command to said comparator means after expiration of a predetermined number of signals.

10. The combination as defined in claim 9 including means in controlling relationship for coupling said counting means to said individual means for storing.

References Cited by the Examiner

UNITED STATES PATENTS

| | | | |
|---|---|---|---|
| 3,044,696 | 7/1962 | Feissel | 340—146.3 |
| 3,188,611 | 6/1965 | Perotto | 340—146.3 |

FOREIGN PATENTS

| | | |
|---|---|---|
| 1,319,644 | 1/1963 | France. |
| 915,344 | 1/1963 | Great Britain. |
| 916,305 | 1/1963 | Great Britain. |

MAYNARD R. WILBUR, *Primary Examiner.*

MALCOLM A. MORRISON, *Examiner.*

J. E. SMITH, J. SCHNEIDER, *Assistant Examiners.*